(12) United States Patent
Kaizuka (10) Patent No.: US 7,609,104 B2
(45) Date of Patent: Oct. 27, 2009

(54) SPREAD SPECTRUM CLOCK GENERATOR

(75) Inventor: Masao Kaizuka, San Jose, CA (US)

(73) Assignee: Toshiba America Electronic Components, Inc.

( * ) Notice: Subject to any disclaimer, the term of this patent is extended or adjusted under 35 U.S.C. 154(b) by 405 days.

(21) Appl. No.: 11/553,300

(22) Filed: Oct. 26, 2006

(65) Prior Publication Data

US 2008/0100365 A1     May 1, 2008

(51) Int. Cl.
    *G06F 1/04*     (2006.01)
(52) U.S. Cl. ....................... 327/291; 327/299
(58) Field of Classification Search .............. None
See application file for complete search history.

(56) References Cited

U.S. PATENT DOCUMENTS

| | | | | |
|---|---|---|---|---|
| 5,221,863 | A | * | 6/1993 | Motegi ............... 327/157 |
| 5,488,627 | A | | 1/1996 | Hardin et al. |
| 5,646,968 | A | * | 7/1997 | Kovacs et al. ........... 375/375 |
| 6,005,445 | A | * | 12/1999 | Katakura ............... 331/34 |
| 6,046,620 | A | | 4/2000 | Relph |
| 6,084,933 | A | * | 7/2000 | Kubinec ............... 375/362 |
| 6,377,646 | B1 | | 4/2002 | Sha |
| 6,507,229 | B1 | * | 1/2003 | Aoyama ............... 327/281 |
| 6,597,226 | B1 | | 7/2003 | Eade et al. |
| 6,643,317 | B1 | | 11/2003 | Blumer |
| 7,049,845 | B1 | | 5/2006 | Chan |
| 7,061,293 | B2 | | 6/2006 | Fukushima |

FOREIGN PATENT DOCUMENTS

WO     WO 00/45246 A1     8/2000

OTHER PUBLICATIONS

Chang, et al., A Spread-Spectrum Clock Generator With Triangular Modulation, IEEE Journal of Solid State Circuits, vol. 38, No. 4, pp. 673-676, Apr. 2003.
Wilson, Ron, Architectures: Digital Synthesis Enables Complete Clock Control, Aug. 15, 2005, http://www.eetimes.com/showArticle.jhtml?articleID=168600723.
GigaBaudics, Programmable Digital Delay Line—Model PDDL10, http://www.gigabaudics.com/PDDL10/pddl10.html.

* cited by examiner

*Primary Examiner*—Cassandra Cox
(74) *Attorney, Agent, or Firm*—Tucker Ellis & West LLP

(57) ABSTRACT

A digitally controlled delay line generates a clock signal. The clock signal can be modulates as a spread spectrum clock signal. In an example embodiment, the programmable delay line has an input for receiving a signal, an output that delays outputting the input signal by a time period programmed into a delay value input. A feedback loop comprising an inverter is coupled between the input and the output of the programmable delay line.

17 Claims, 12 Drawing Sheets

| DF | CX | | | | | | | |
|---|---|---|---|---|---|---|---|---|
| | 0 | 1 | 2 | 3 | 4 | 5 | 6 | 7 |
| 0 | 2DM | 2DM | 2DM | 2DM | 2DM | 2DM | 2DM | 2DM |
| 1 | 2DM | 2DM | 2DM | 2DM+1 | 2DM+1 | 2DM | 2DM | 2DM |
| 2 | 2DM | 2DM+1 | 2DM+1 | 2DM | 2DM | 2DM+1 | 2DM+1 | 2DM |
| 3 | 2DM+1 | 2DM+1 | 2DM | 2DM+1 | 2DM+1 | 2DM+1 | 2DM+1 | 2DM |
| 4 | 2DM+1 | 2DM+1 | 2DM+1 | 2DM+1 | 2DM+1 | 2DM+1 | 2DM+1 | 2DM+1 |
| 5 | 2DM+1 | 2DM+1 | 2DM+1 | 2DM+1 | 2DM+2 | 2DM+1 | 2DM+1 | 2DM+2 |
| 6 | 2DM+1 | 2DM+1 | 2DM+2 | 2DM+2 | 2DM+1 | 2DM+1 | 2DM+2 | 2DM+2 |
| 7 | 2DM+2 | 2DM+2 | 2DM+1 | 2DM+1 | 2DM+2 | 2DM+2 | 2DM+2 | 2DM+2 |

| Target | BP | OF | MC | MR | MDF | Modulation Frequency |
|---|---|---|---|---|---|---|
| 0.0% | 54 | 2 | 5 | 0 | 32 | 31.25 KHz |
| 0.8% | 54 | 2 | 5 | 270 | 32 | 31.25 KHz |
| 1.6% | 54 | 2 | 5 | 541 | 32 | 31.25 KHz |
| 2.4% | 108 | 4 | 4 | 405 | 32 | 31.25 KHz |
| 3.2% | 108 | 4 | 4 | 541 | 32 | 31.25 KHz |
| 4.0% | 108 | 4 | 4 | 676 | 32 | 31.25 KHz |
| 4.8% | 108 | 4 | 4 | 811 | 32 | 31.25 KHz |
| 5.6% | 108 | 4 | 4 | 947 | 32 | 31.25 KHz |
| 6.4% | 216 | 8 | 3 | 541 | 32 | 31.25 KHz |
| 7.2% | 216 | 8 | 3 | 608 | 32 | 31.25 KHz |
| 8.0% | 216 | 8 | 3 | 676 | 32 | 31.25 KHz |

FIGURE 15

| | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|
| Name | EN | MC[1:0] | | OF[3:0] | | | | BP[8:0] | | | | | | | | |
| Type | R/W | R/W | | R/W | | | | R/W | | | | | | | | |
| Default | 0 | 0 | | 0 | | | | 0 | | | | | | | | |

| | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| Name | MDF[4:0] | | | | | MR[10:0] | | | | | | | | | | |
| Type | R/W | | | | | R/W | | | | | | | | | | |
| Default | 0 | | | | | 0 | | | | | | | | | | |

| Bit | Mnemonic | Description | Reset | R/W |
|---|---|---|---|---|
| 31 | EN | SSCG Enable<br>EN=0 → Bypath SSCG Module (Source 27 MHz → SSCG Output)<br>EN=1 → SSCG Output Enable | 0x0 | R/W |
| 30:29 | MC[1:0] | SSCG Master Cycle<br>MC=00 → Master Cycle = 4<br>MC=01 → Master Cycle = 8<br>MC=10 → Master Cycle = 16<br>MC=11 → Master Cycle = 32 | 0x0 | R/W |
| 28:25 | OF [3:0] | Overshoot Factor<br><br>Below picture describes SSCG modulation waveform. It has steep gradient portion after every frequency turn over. OF defines duration of this steep portion, where BP defines total period. See E e.g., Table 2, Sample Parameter Table | 0x0 | R/W |
| 24:16 | BP[8:0] | Base Period<br><br>The value of BP defines the period of modulation pattern that corresponds to modulation period (reverse of frequency). The modulation frequency will be given by formula below. See E e.g., Table 2, Sample Parameter Table<br><br>Modulation Frequency = F(source) x 2 / ( BP x Master Cycle) | 0x00 | R/W |
| 15:11 | MDF[4:0] | Delay Line Minimum Delay Factor<br><br>Set the value of minimum delay with a factor of unit delay. Actual number will be given after ES evaluation. Budgetary number is 32. | 0x0 | R/W |
| 10:0 | MR[10:0] | Converted Divisor for Modulation Magnitude<br><br>Set exact number calculated by formula below: (Note Tmod is target modulation rate. ex 0.008 for 0.8% modulation. See E; e.g., Table 2, Sample Parameter Table<br>MR = ($2^{20}$) x Tmod / (BP/2 + 2 x OF) (note: $2^{20}$ = 1,048,576) | 0x0000 | R/W |

SPREAD SPECTRUM CLOCK GENERATOR

BACKGROUND OF THE INVENTION

The concept of spread-spectrum clocking is gaining popularity as a simple way to lower electromagnetic interference (EMI), which is becoming more severe as processor speeds increase. A system creates an EMI spike that matches its clock frequency. As processor speeds increase, the peaks can become severe enough to violate Federal Communications Commission regulations. Spread-spectrum clocking speeds up and slows down the clock within a few percent of its target frequency, thus flattening out the EMI peak by spreading it across a range of frequencies Spread-spectrum clock generation (SSCG) is used in the design of synchronous digital systems, especially those containing microprocessors, to reduce the spectral density of the electromagnetic interference (EMI) that these systems generate. A synchronous digital system is one that is driven by a clock signal and because of its periodic nature, has an unavoidably narrow frequency spectrum. In fact, a perfect clock signal would have all its energy concentrated at a single frequency and its harmonics, and would therefore radiate energy with an infinite spectral density. Practical synchronous digital systems radiate electromagnetic energy on a number of narrow bands spread on the clock frequency and its harmonics, resulting in a frequency spectrum that, at certain frequencies, can exceed the regulatory limits for electromagnetic interference (e.g. those of the FCC in the United States, JEITA in Japan and the IEC in Europe).

The conventional Spread Spectrum Clock Generation (SSCG) module comprises a phased lock loop (PLL) and an analog signal generator to modulate the oscillating frequency by phase shifting using a VCO (voltage controlled oscillator) input. This approach is widely used, however, because this circuit is a kind of mixed signal circuit, the design usually requires special expertise.

BRIEF SUMMARY OF THE INVENTION

There is described herein a technique for generating a clock signal, with or without frequency modulation. A digitally controlled programmable delay-line generates a clocking signal which can be modulated as a spread spectrum clock signal.

In one exemplary embodiment described herein, there is disclosed an apparatus comprising a programmable delay line with a signal input, a signal output and a delay value input. An inverter is coupled between the signal input and the signal output of the programmable delay line. When a signal is received at the signal input, the signal is delayed by a time period based on a value received at the delay value input before appearing at the signal output.

Still other objects of the present invention will become readily apparent to those skilled in this art from the following description wherein there is shown and described a preferred embodiment of this invention, simply by way of illustration of at least one of the best modes best suited to carry out the invention. As it will be realized, the invention is capable of other different embodiments and its several details are capable of modifications in various obvious aspects all without departing from the invention. Accordingly, the drawing and descriptions will be regarded as illustrative in nature and not as restrictive.

BRIEF DESCRIPTION OF THE SEVERAL VIEWS OF THE DRAWING

The accompanying drawings incorporated in and forming a part of the specification, illustrates several aspects of the present invention, and together with the description serve to explain the principles of the invention.

FIG. 7 illustrates an example decoder truth table for mode 3 of FIG. 6.

FIG. 8 illustrates an example decoder truth table for mode 2 of FIG. 6.

DETAILED DESCRIPTION OF INVENTION

Throughout this description, the preferred embodiment and examples shown should be considered as examples, rather than limitations, of the present invention.

Figure 1:
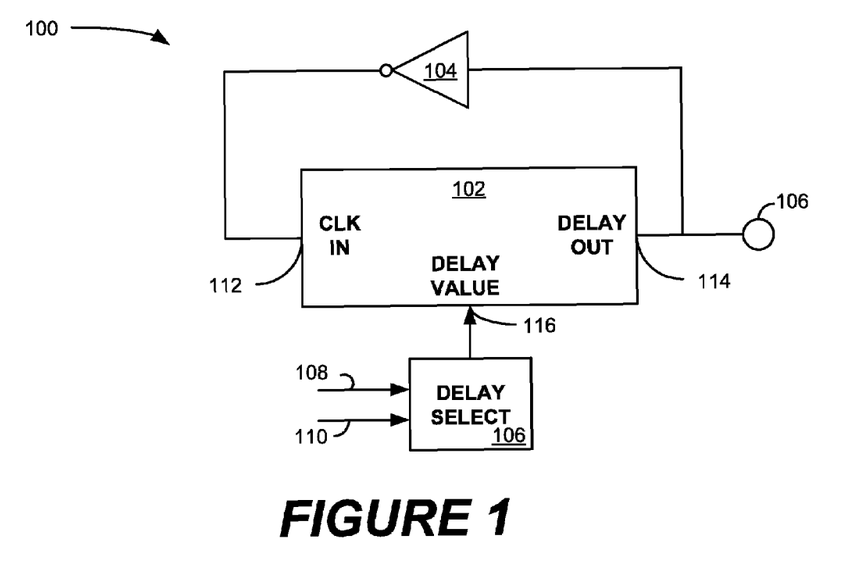
FIG. 1 illustrates an example of a clock generation circuit.

FIG. 1 illustrates an example of a clock generation circuit 100. Circuit 100 comprises a programmable delay line 102. Programmable delay line receives a signal (CLK IN) at input 112 and outputs the signal (DELAY OUT) at output 114 after a predetermined delay. The time period for the predetermined delay can be set by sending a signal to the delay value input 116.

An inverter 104 is coupled between output 114 and input 112 of programmable delay line 102. This provides a feedback loop between output 114 and input 112 of programmable delay line 102 wherein the inverted output signal is feedback to input 112. In operation, once the circuit is energized, a signal that is received at input 112 is delayed before being output at output 114. Once the signal is output on output 114, inverter 104 feeds back an inverted output signal to input 112. After the predetermined delay, the inverted output signal is output is output at output 114, wherein inverter 104 inverts the inverted output signal. Thus circuit 100 oscillates; the frequency of the oscillation is determined by the time period of the predetermined delay. As illustrated, a clock signal can be obtained at node 106, but those skilled in the art can readily appreciate that a clock signal can also be obtained from the output of inverter 104. Also, it should be noted that this circuit does not generate clock signals by phase shifting.

Optionally, circuit 100 can include a delay select circuit 106 to improve the resolution of programmable delay line 102. For example, delay value input 116 having a fixed width would ordinarily be limited to the resolution of the fixed width.

However, delay select circuit receives two input signals 108, 110, the first signal 108 a delay mantissa value (e.g. a coarse setting which can have the same width as delay value input 116) and the second signal 110 a delay fractional setting (e.g. a fine setting).

As will be described herein, delay select circuit 106 changes the value of the signal to input 116 to increase the resolution of delay value input 116. For example, if delay input 16 has 9 bits of resolution, signal 108 has 9 bits of resolution and signal 110 has 4 bits of resolution, delay select circuit modifies the signal input to delay value 116 to expand the resolution of delay value input by 4 bits. This can be accomplished by changing the signal sent to delay input 116 by 1 bit for the desired number of cycles over a period. For example, for a 16 cycle period, where n=the delay value of signal 108 (the delay mantissa 'dm') and the delay value of signal 110 is the delay fraction 'df', then for a 16 cycle period df cycles are generated using dm+1 for the delay value and 16-df cycles are generated using dm for the delay value. Thus, for 16 cycles, the Total period=[df/16]*Delay(dm+1)+[16−df]*dm. This allows an additional 1/16 resolution for input delay value 116.

Figure 2:
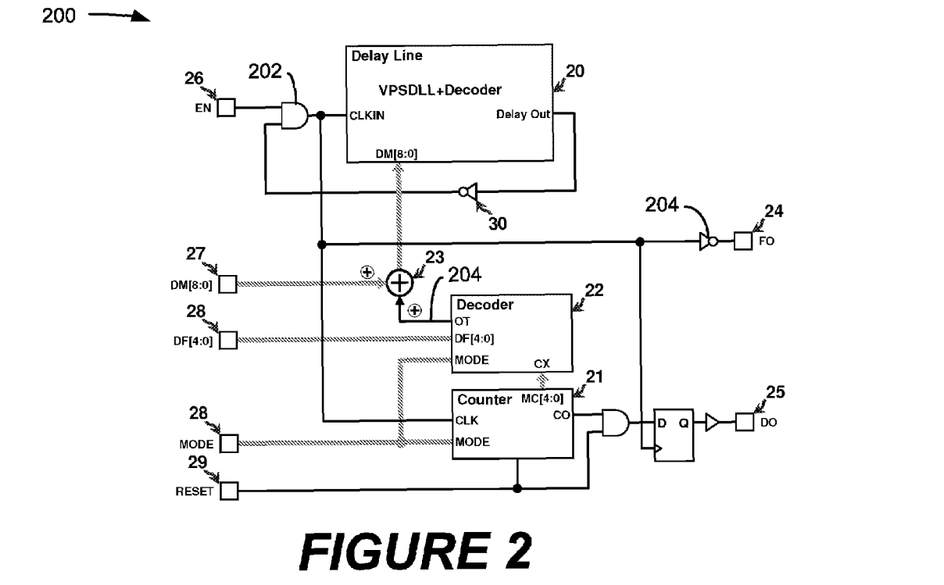
FIG. 2 illustrates a detailed example of an extended delay line.

FIG. 2 illustrates a detailed example of an extended delay line 200. The extended delay line comprises a conventional delay line 20 (e.g. a programmable delay line) that has an input DM to select a unit delay. For example if DM has 9 bits, then a unit delay out of 512 can be selected. The output (Delay Out) of delay line 20 is coupled to the input (CLKIN) through AND gate 202.

Extended delay line receives an enable signal (EN) at node 26. The delay values (delay mantissa 'DM' or 'DM[8:0]' and delay fraction 'DF' or 'DF[3:0]') are received at nodes 27, 28 respectively. For purposes of this example, DM[8:0] represents a 9 bit signal and DF[3:0] a 4 bit signal, although it should be appreciated that any reasonable number of bits can be used for DM and DF. A mode signal is received at node 28 and a reset signal at node 29. The clock output signal (FO) is acquired at node 24 and a delay pulse output (DO) is acquired at node 25.

In operation, once the enable (EN) input 26 is asserted, circuit 200 starts to oscillate and generates a clock signal. The clock signal generated is determined by the signal input into delay line 20 (as illustrated in this example DM[8:0], a 9 bit input). As will be explained herein, decoder 22, summer 23 and counter 21 function as a delay adjust circuit to modify the signal (DM[8:0]) input into delay line 20 to increase the resolution of delay line 20. The resolution of extended delay line 200 is set by the delay mantissa (DM or DM[8:0], 9 bits in this example) and the delay fraction (DF or DF[3:0], 4 bits in this example).

Counter 21 counts the clock signals. The output of counter 21 is coupled to decoder 22. Decoder decodes CX (output of counter 21) mode and DF and generates an output 204 that is input into summer 23. When decoder 22 outputs a zero, then the delay signal DM[8:0] received by delay line 20 is from summer 23 is the same as the delay mantissa received at node 27. However, when decoder 22 outputs a 1, then the delay signal DM[8:0] received by delay line 20 equals the delay mantissa received at node 27 plus one.

Figure 3:
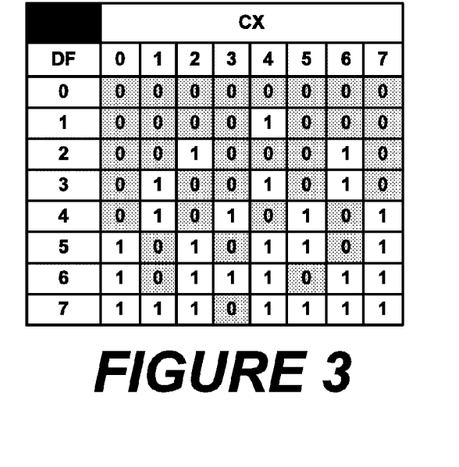
FIG. 3 illustrates an example of decoder outputs for the decoder used in the circuit of FIG. 2.

FIG. 3 illustrates an example of decoder outputs for decoder 22 used in the circuit of FIG. 2. In the example of FIG. 3, only three bits of DF[3:0] are effective providing an additional 1/8 resolution to DM[8:0] received at node 27. As will be explained herein, depending on the mode, the resolution of decoder 22 can be set from 1 bit to 4 bits. If no fine delay is desired, then DF can be set to zero, and decoder 22 will always output a zero and DM input into summer 23 will not be adjusted. As another example, if the desired delay is DM[8:0] received at node 27 plus 1/8, the delay value DM[8:0] received by delay line 20 is equal to the value of DM[8:0] received at node 27 for seven cycles and the value of DM[8:0] received at node 27 plus one for one cycle out of 8. More generically, for generating a signal having a total period of n/8 over an 8 cycle period, then decoder 22 outputs a one for n cycles over the period and a zero for 8-n cycles.

Figure 4:
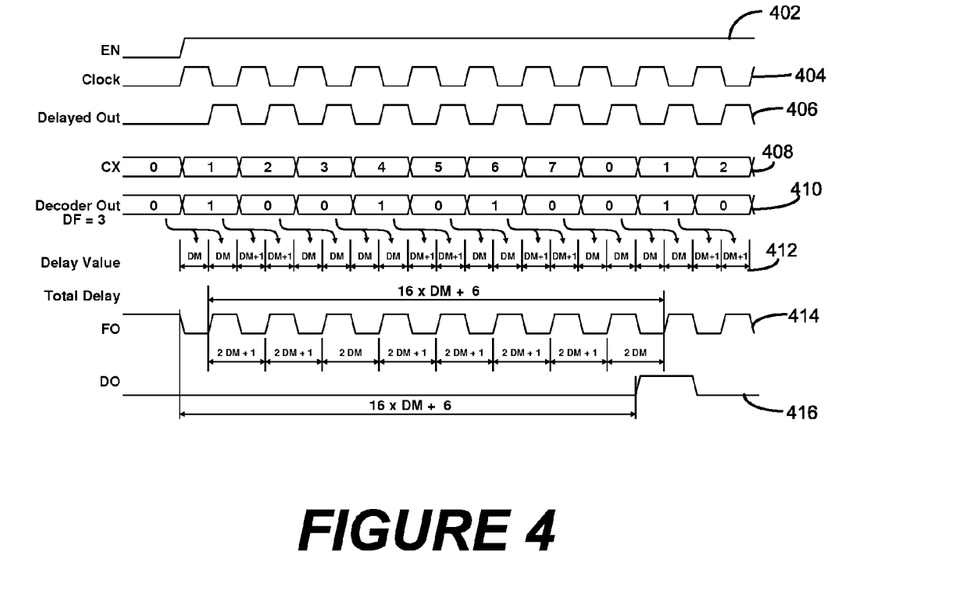
FIG. 4 illustrates an example signal diagram for the circuit described in FIG. 2.

FIG. 4 illustrates an example signal diagram for the circuit described in FIG. 2. Enable signal (EN) 402 represents the enable signal received at node 26. Clock 404 represents the signal at the input (CLKIN) of delay line 20. Delayed out 406 represents the signal at the output (Delay Out) of delay line 20. CX 408 represents the output of counter 21. Decoder out 410 represents the output of decoder 22. In this example, DF=3 (see e.g. FIG. 3). Delay value 412 represents the delay value signal sent to programmable delay line 20, e.g. the output of summer 23. Values listed as DM represent the value of the delay mantissa, DM[8:0], received at node 27 and values DM+1 represent the value of the delay mantissa DM[8:0] received at node 27 incremented by one. FO 14, represents the clocking signal acquired at node 24. Note that inverter 24 matches FO 14 with the delay out output of delay line 20 and provides a buffer between FO 14 and the input (CLKIN) of delay line 20. Delay (pulse) output, DO 418, signals the end of a period (e.g. 8 cycles, 16 cycles, etc. depending upon the current mode). Note that the total period for 8 cycles in this example equals 16*DM+6, or the average clock period equals (16*DM+6)/8.

Figure 5:
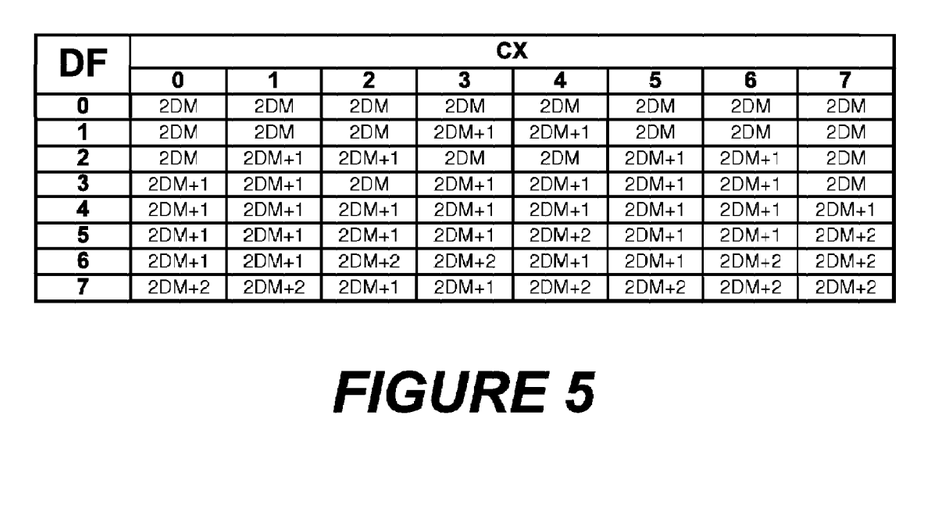
FIG. 5 illustrates an example of period distribution for clock signals generated by the circuit of FIG. 2.

FIG. 5 illustrates an example of period distribution for clock signals generated by extended delay 20 of FIG. 2 for an additional 8 bit resolution. The values DM represent the value of the delay mantissa received at node 27 and the values DM+1 represent the value of the delay mantissa received at node 27 plus one. Note that these values correspond to the decoder 22 output illustrated in FIG. 3. For example, when DF=3, the total period (from CX=0 to CX=8) is 16*DM+6, which corresponds to the example illustrated in FIG. 4.

Figure 6:
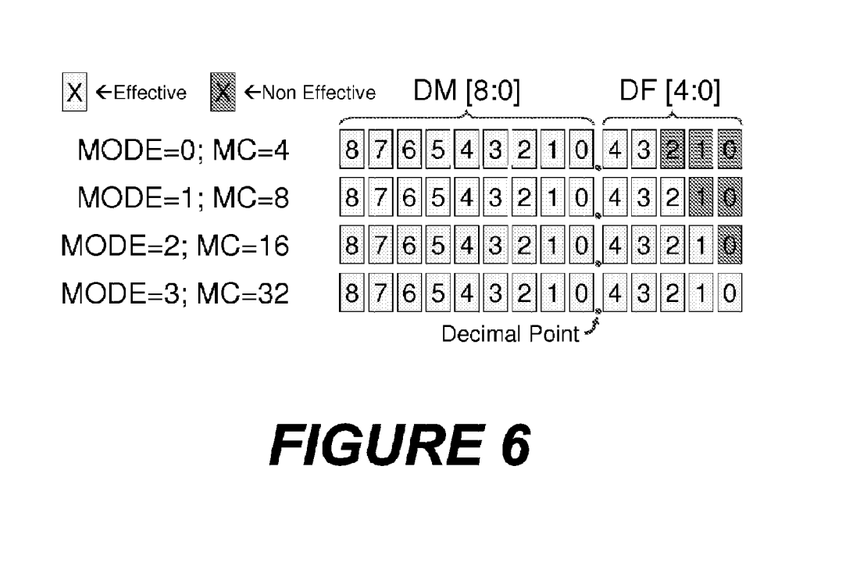
FIG. 6 illustrates an example of additional resolution obtained based on the mode signal for the circuit illustrated in FIG. 2.
Figure 9:
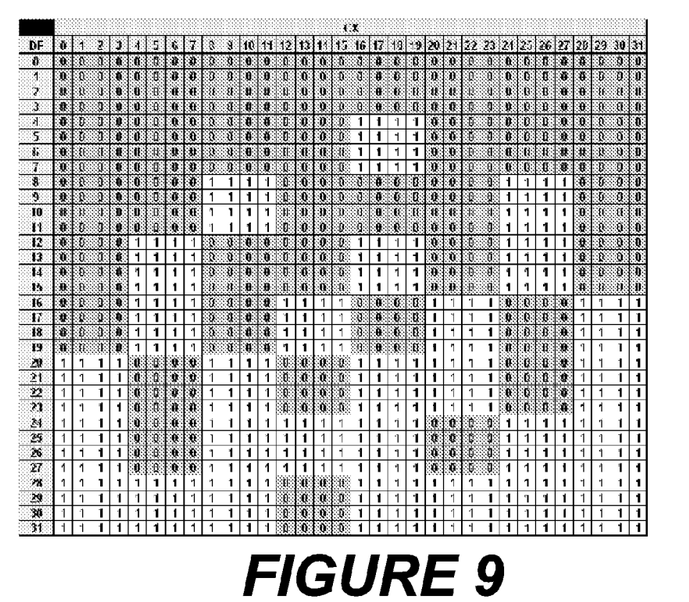
FIG. 9 illustrates an example decoder truth table for mode 1 of FIG. 6.
Figure 10:
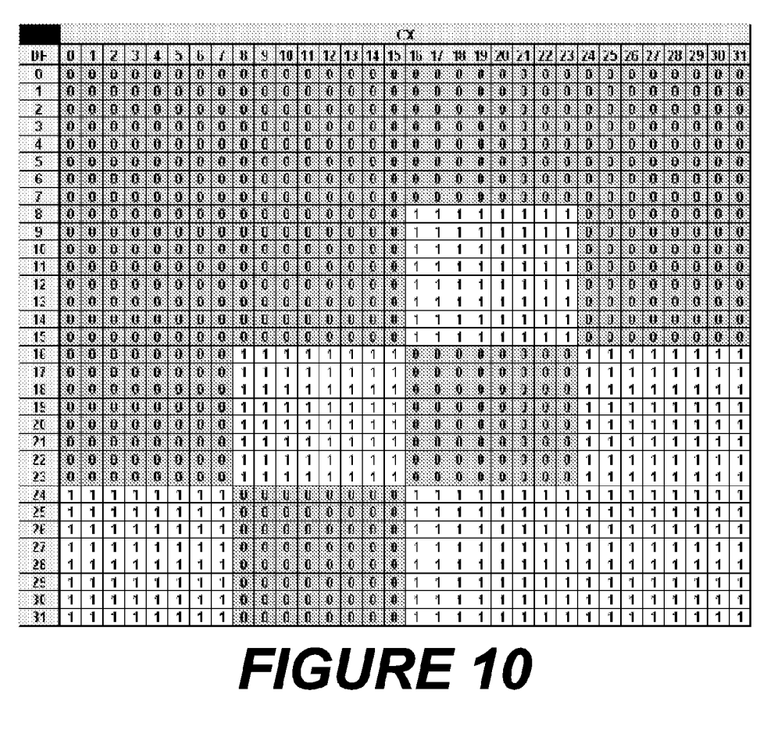
FIG. 10 illustrates an example decoder truth table for mode 0 of FIG. 6.

FIG. 6 illustrates an example of additional resolution obtained based on the mode signal for the extended delay line 200 illustrated in FIG. 2. For example, when Mode=0, only the 2 most significant bits of DF[4:0] are utilized, resulting in an increased resolution over four cycles (Master Cycle 'MC'). FIG. 10 illustrates an example truth table for decoder 22 for mode 0. When Mode=1 in FIG. 6, only the 3 most significant bits of DF[4:0] are utilized, resulting in an increased resolution over 8 cycles. FIG. 9 illustrates an example truth table for decoder 22 for mode 1. Note that this resolution corresponds to the examples illustrated in FIGS. 2-5. When Mode=2 in FIG. 6, only the 3 most significant bits of DF[4:0] are utilized, resulting in an increased resolution over of 16 cycles. FIG. 8 illustrates an example truth table for decoder 22 for mode 2. When Mode=3, all 4 bits of DF[4:0] are utilized, resulting in an increased resolution over 32 cycles. FIG. 7 is an example truth table for decoder 22 for mode 3.

Figure 11:
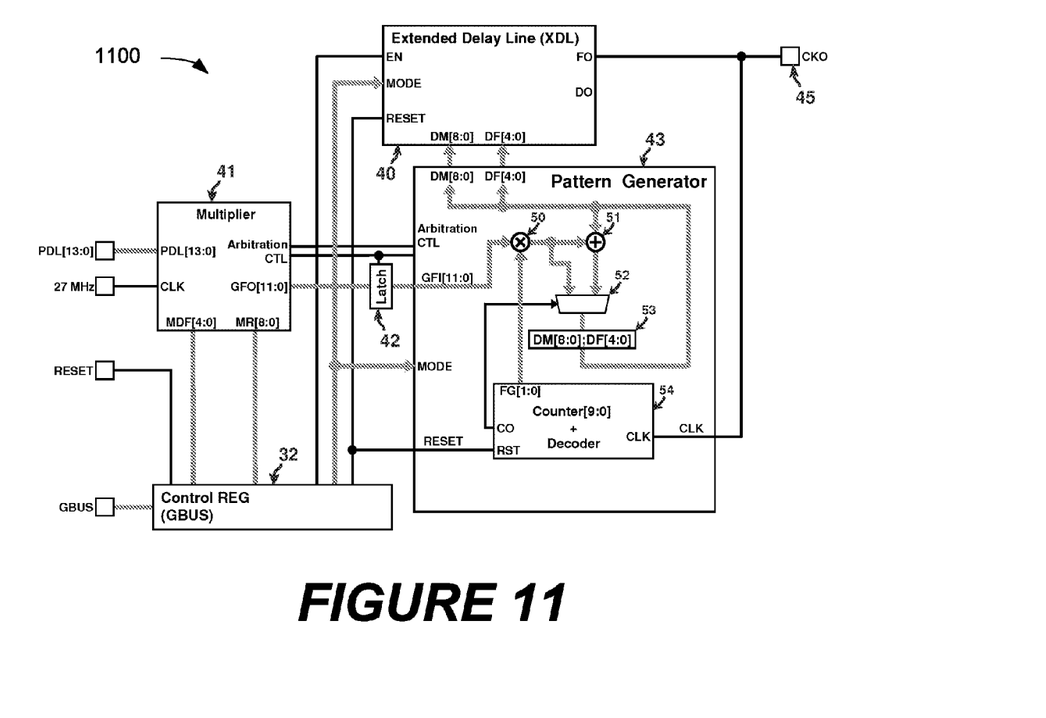
FIG. 11 illustrates an example of a Spread Spectrum Clock Generator.

FIG. 11 illustrates an example of a Spread Spectrum Clock Generator 1100. Extended delay line (XDL) 40 is configured to function as explained with reference to extended delay line 200 in FIG. 2. The clock output (CKO) is acquired from the output (FO) of extend delay line 40 at node 45. Extended Delay Line 40 receives the values for the delay (delay mantissa 'DM' or the coarse delay, and delay fraction 'DF' or fine delay) from Pattern Generator 43, which selects DM and DF to obtain the desired spread spectrum pattern.

Figure 12:
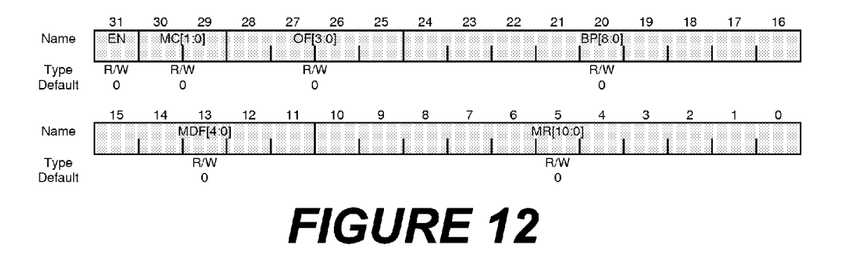
FIG. 12 illustrates an example control register.
Figure 14:
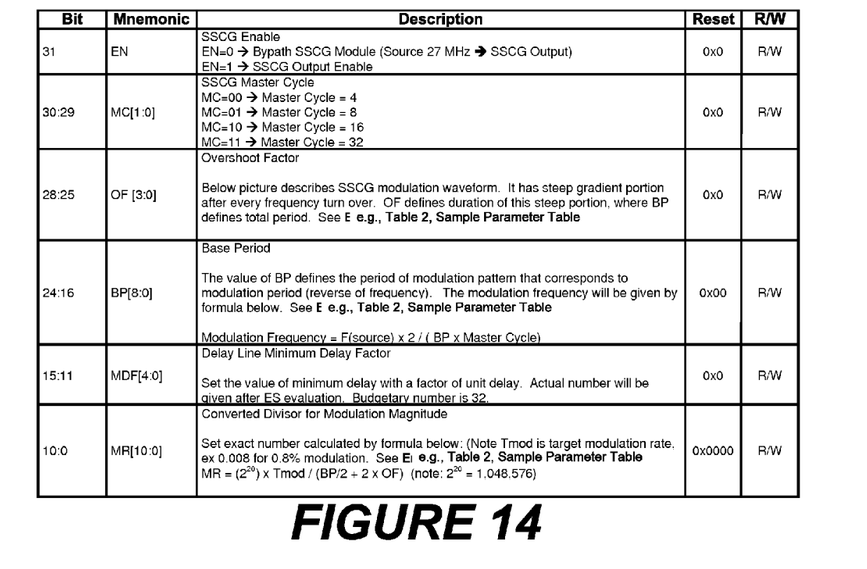
FIG. 14 illustrates an example of settings for the control register described in FIG. 12.

FIG. 12 illustrates an example control register for the spread spectrum clock generator 1100 illustrated in FIG. 11. The control register is programmed with the parameters for clock signal generation. The definition of the control bits are as follows and are illustrated in FIG. 14.

Bit 31 is the enable (EN) bit. When enable is off, EN=0, no clock signal is output. When EN=1, the output is enabled.

Bits 29-30 are the mode, Master Cycle (MC), bits. These bits determine how many clock cycles are in a cycle. When MC=00, the Master Cycle=4, when MC=01, the Master Cycle=8, when MC=10, the Master Cycle=16 and when MC=11, the Master Cycle=32.

Bits 25-28 specify the overshoot factor (OF). Referring to FIG. 3, there is illustrated a spread spectrum clock generation modulation waveform. BP is the base period and defines the total period. F BASE is the initial frequency or base frequency when the time period for the pulse is at a minimum, and hence the base frequency is the maximum frequency. F MIN is the frequency when the pulse duration is at a maximum, and therefore is the lowest frequency during the base period. At each frequency turn over there is a steep gradient portion. OF defines the duration of the steep gradient portion.

Bits 16-24 define the base period (BP). The value of BP defines the period of the modulation pattern that corresponds to the modulation period (the opposite of frequency). The modulation frequency is given by the formula:

Modulation Frequency=$F$(source)×2/($BP$×Master Cycle).

Bits 11-15 specify the delay line minimum delay factor (MDF). This sets the value of minimum delay with a factor of unit delay. the actual number will be determined after ES evaluation.

Figure 15:
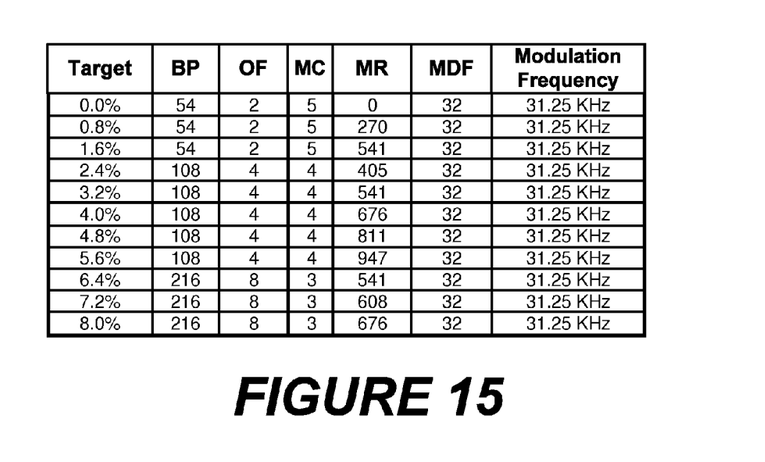
FIG. 15 illustrates example parameter table.

Bits 0-10 specify the modulation ratio (MR) which is the converted divisor for modulation magnitude. In the example illustrated MR=$2^{20}$×Tmod/(BP/2+2×OF) where Tmod is the target modulation rate. For example, FIG. 15 illustrates an example parameter table for a target modulation rates 0% to 8% (e.g. 0.008) modulation with a modulation frequency of 31.25 KHz along with various values for BP, OF, MC and MDF from which the MR can be calculated.

Figure 13:
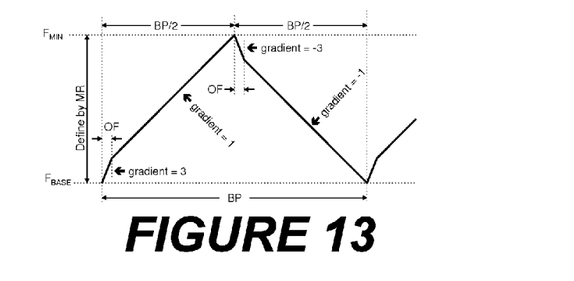
FIG. 13 illustrates an example of frequency versus modulation period.

FIG. 13 illustrates an example of frequency versus modulation period. As can be observed from FIG. 13, the difference from F BASE (the maximum frequency or frequency with minimum clock period) and F MIN (the minimum frequency or frequency with maximum clock period) is defined by MR. The BP is the total period for one period of spread spectrum modulation. As shown, the frequency decreases during the first half of the period (BP/2) and increases during the second half (BP/2) of the period; however, which period begins first is not important. Each time the frequency turns over (e.g. changes from increasing to decreasing or from decreasing to increasing) there is a portion with a steeper gradient (3 in this example) during the period defined by OF. The remainder of BP/2 (e.g. BP/2-OF) has a gradient of one.

Referring again to FIG. 11, pattern generator 43 comprises a counter and decoder 54. The counter counts from 0 to (BP−1) and asserts CO which is used for selecting the output of multiplexer 52. At the next clock cycle (BP), the counter resets itself.

Multiplier 41 receives a clock input (CLK) and PDL (the corresponding value of one modulation period)), and MR and MDF from control register 32. Multipler 41 calculates a product, the Global Factor Output (GFO) which is the number of delay units that will generate exactly one period of clock input. The product can be calculated by $GFO[11:0]=(PDL[13:0]+MDF[4:0])\times MR[9:0]/2^{20}$.

This value is measured by the delay line and compensates all fractional delay line performance. In systems with multiple clocking cycles (see for example FIG. 16), latch 42 can be employed to pass GFO as the Global Factor Input (GFI) and input into multiplier 50. Because the value of GFO may be updated periodically, Arbitration and CTL lines are employed to synchronize GFI to GFO. Multiplier 51 also receives an output from a function generator in counter and decoder 54. The function generator comprises 2 bits for specifying the gradient. For example at the beginning of BP/2, during the period specified by OF, the function generator would output +3 or −3, depending on whether frequency is decreasing or increasing respectively, and a +1 or −1 otherwise. For example, referring also to FIG. 13, Function generator output from 0 to OF−1 would be 3, from OF to BP/2 would be 1, from BP/2 to BP/2+OF the output would be −3 and from BP/2+OF to BP the output is 1. The output of multiplier 54 is sent to summer 51 and is also an input of multiplexer 52. The output of multiplexer 52 is latched by latch 53. Summer 51 sums the current values of DM, DF from latch 53 and the output of multiplier 50.

One skilled in the art should readily appreciate that pattern generator 43 is but one example of a method for generating a spread spectrum clock generator (SSCG) pattern. Extended delay line 40 is suitably adapted to receive any type of modulation pattern for SSCG.

Figure 16:
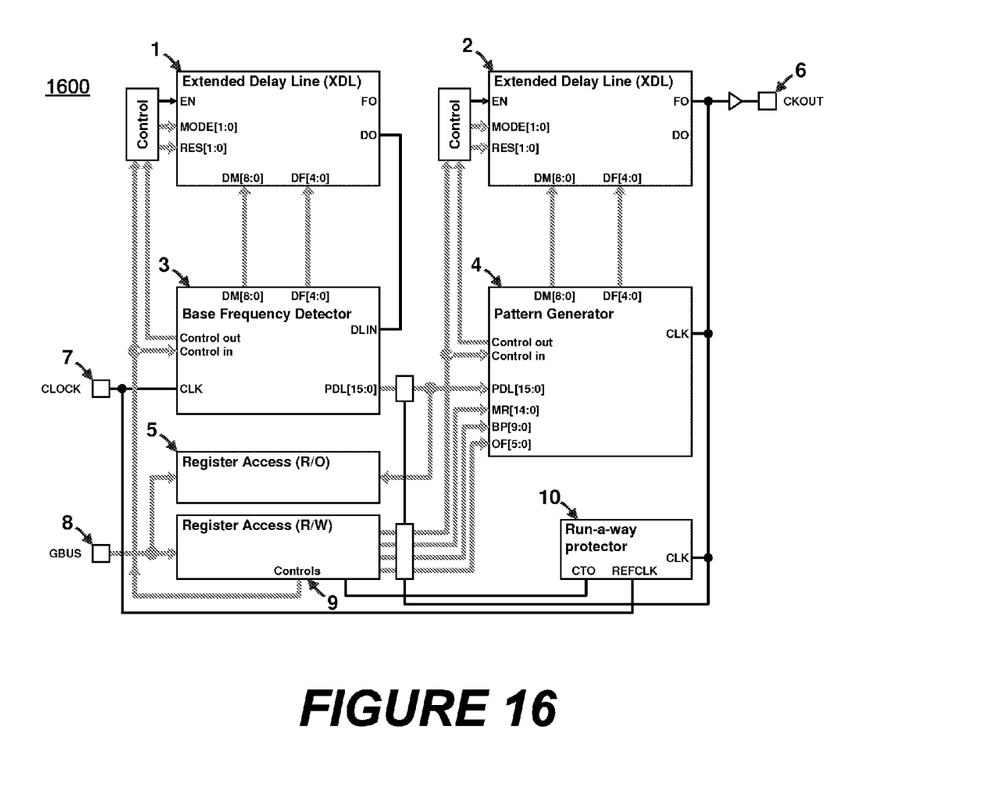
FIG. 16 illustrates an example clocking system for generating multiple clocking signals, including a spread spectrum clocking signal.

FIG. 16 illustrates an example clocking system 1600 for generating multiple clocking signals, employing two extended delay lines. Extended delay line (XDL) 1 and XDL 2 are configured such as described herein (see e.g. FIGS. 1 and 2). For example, system 1600 can be configured to receive a reference clock (e.g. 27 MHz) at node 7 and output a first clocking signal (e.g. 27 MHz) and a second clocking signal (e.g. 54 MHz) that is spread spectrum modulated (CK-OUT) acquired at node 6. In this example, extended delay line 1 in conjunction with control unit 3 measures the period of the input clock. Extended delay line 2 in conjunction with pattern generator 4 (e.g. a pattern generator configured as described in FIG. 11) generates a double frequency clock (54 MHz) with spread spectrum modulation. Control registers 5 and 8 are employed to specify the parameters for the double frequency clock with spread spectrum modulation. System 1600 also includes a Run-a-way protector circuit 10, an example of which will be described herein (see FIG. 17).

Figure 17:
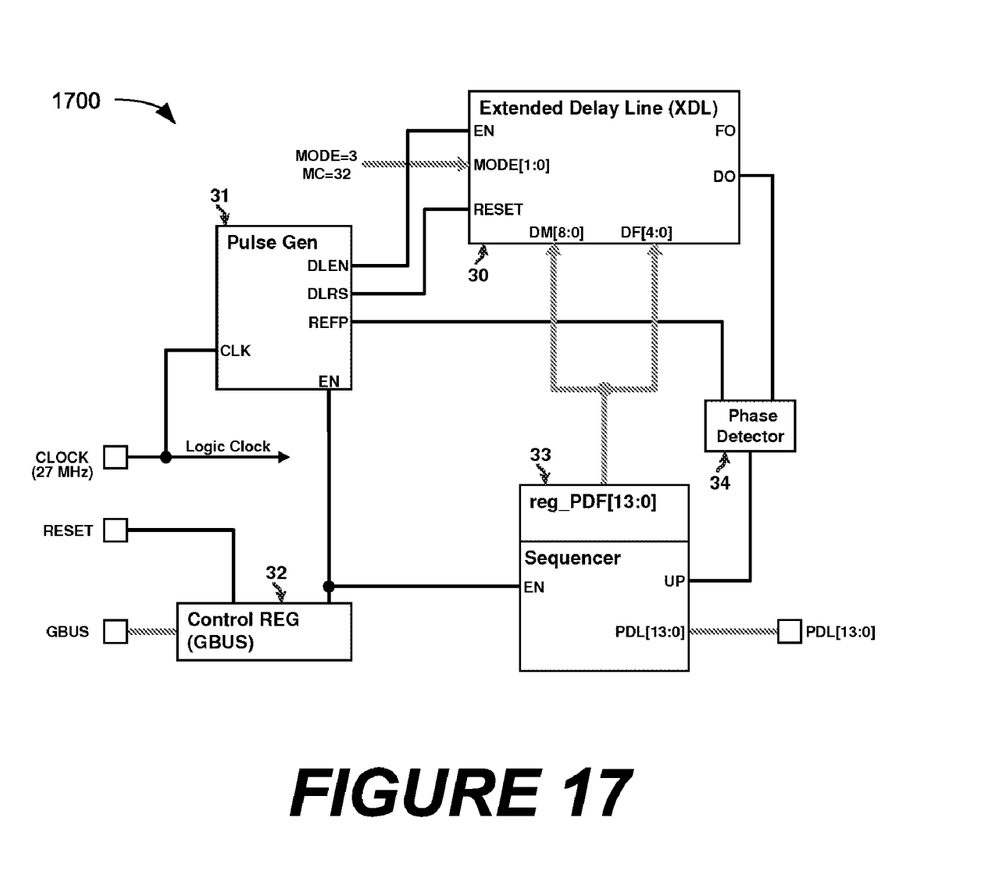
FIG. 17 illustrates an example period detector.
Figure 18:
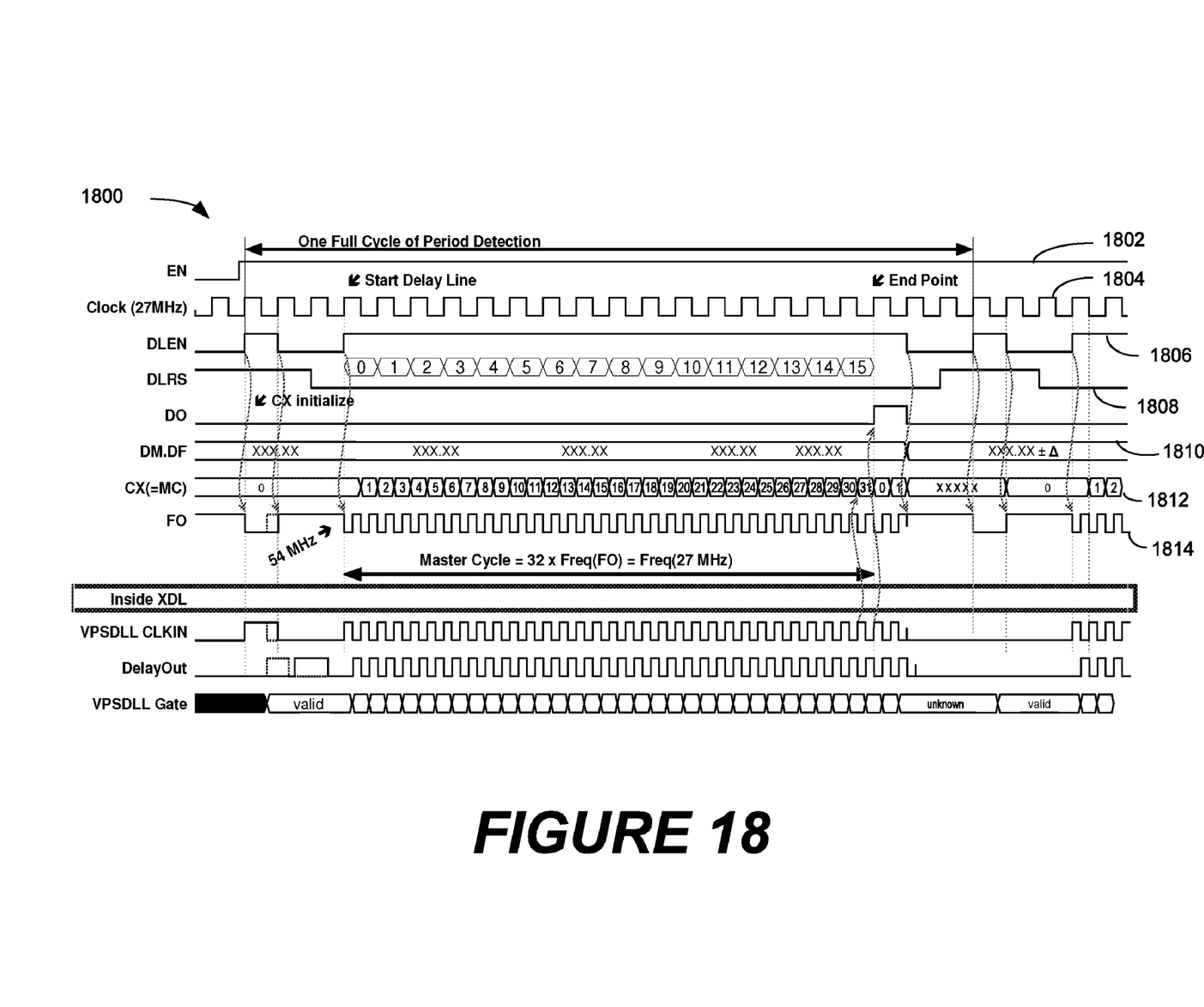
FIG. 18 illustrates an example signal diagram for the period detector described in FIG. 17.

FIG. 17 illustrates an example period detector 1700 for use with system 1600. FIG. 18 illustrates an example signal diagram for period detector 1700 described in FIG. 17. This example shows XDL 30 operating in mode 3 (MC=32) obtaining maximum resolution. Pulse generator 31 receives a reference clock signal (27 MHz in this example) and outputs three signals, Delay Line Enable (DLEN) which is used for the enable (EN) signal of XDL 30, Delay Line Reset (DLR) and reference pulse (REFP) that is input into phase detector 34. The enable bit (EN) of Control register 32 supplies an enable (on) signal to pulse generator 31 and sequencer 33. Sequencer 33 stores the PDL value (PDL[13:0]) and supplied it to multiplier 41 (FIG. 11). Phase detector 34 is also coupled to the DO output of XDL 30 and the UP output of sequencer 33.

Referring to FIG. 18 with continued reference to FIG. 17, enable signal 402 goes high when the enable bit (EN) is set in control register 32. Signal 404 is the reference clock signal (e.g. 27 MHz in this example). The DLEN and DLRS from signals from pulse generator 31 are shown by 1806 and 1808 respectively. DO which signals the end of the period is illustrated by 1810. The counter output for counter 21 (see FIG. 2) is illustrated by 1812. The output FO of XDL 2 is illustrated by 1814.

Figure 19:
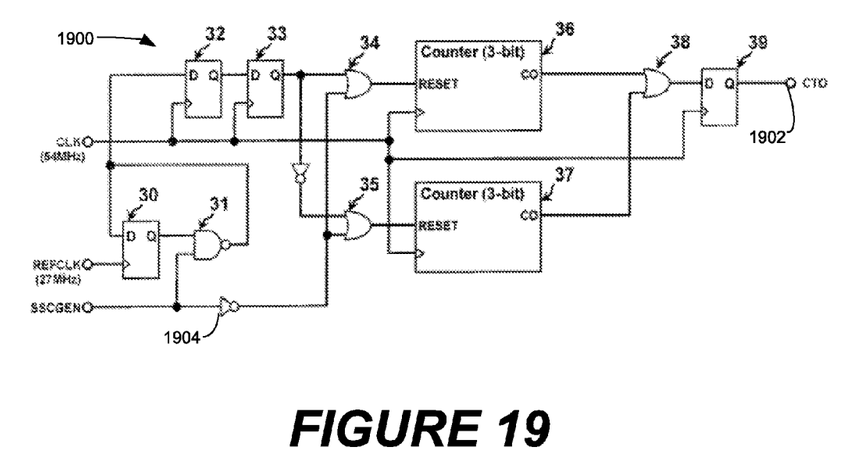
FIG. 19 illustrates an example of a runaway protector.

FIG. 19 illustrates an example of a runaway protector 1900 for system 1600 illustrated in FIG. 16. Runaway protector 1900 will assert CTO 1902 whenever the frequency of the spread spectrum clock generated by XCL 2 exceeds 3× or more the reference clock (REFCLK which is 27 MHz in). CTO 1902 can be provided to the control register to reset the appropriate bit (SSCGEN in this example).

The spread spectrum clock (CLK—54 MHz in this example) triggers latches 32, 33, 39, and provides a reset signal to counters 36 and 37. The reference clock signal (REFCLK—27 MHz in this example) triggers latch 30. The output of latch 30 is provided to NAND gate 31 which is fed back to the input of latch 30 and is provided as an input into latch 32. Latch 33 receives its input from the output of latch 32. The second input of NAND gate 31 receives the Spread Spectrum Clock Generate bit (SSCGEN) from control register 32. The SSCGEN bit is also provided to inverter 1904 that is coupled to OR gates 34 and 35. OR gate 34 is coupled to the reset input of counter 36 (a 3 bit counter in this example) and OR gate 37 is coupled to the reset input of counter 37 (also a 3 bit counter). The outputs of counters 36 and 37 are coupled into OR gate 38 which provide the input into latch 39.

Figure 20:
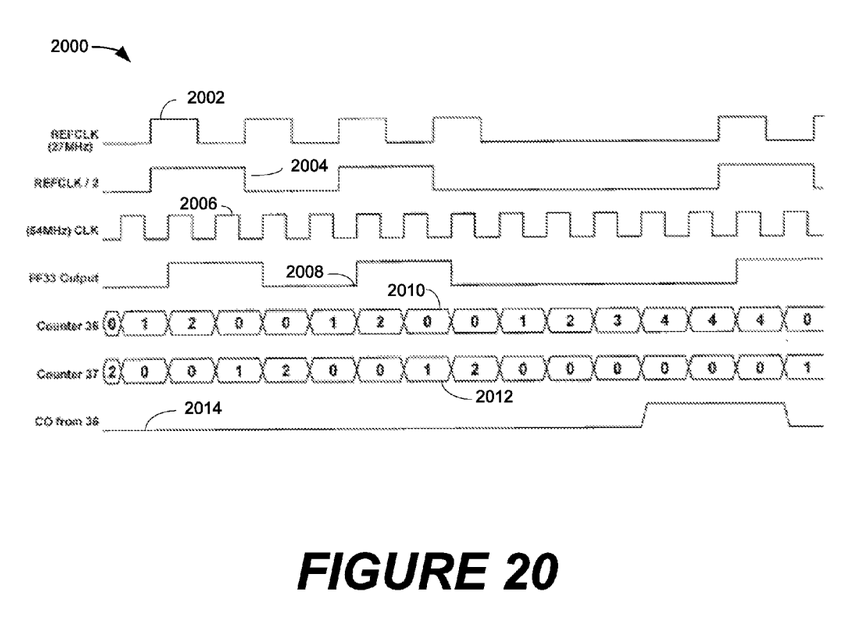
FIG. 20 illustrates an example signal diagram for a runway protector as described in FIG. 19.

FIG. 20 illustrates an example signal diagram 2000 for a runway protector 1900. The reference clock (REFCLK) is illustrated by 2002 and the reference clock divided by two is illustrated by 2004. The 54 MHz clock (CLK) signal (which is actually illustrated as being 3× the reference clock signal or 81 MHz) is illustrated by 5406. The output of latch 33 and the outputs of counters 36 and 37 are illustrated by 2008, 2010 and 2012 respectively. The CO output from counter 36 is output into OR gate 38, and the output of OR gate 38 is provided to latch 39 which provides the CTO signal.

In operation, when the output of latch 33 is low it resets counter 37. When the output of latch 33 is high, it resets counter 36. As shown, during the first cycle of CLK, latch 33 is low, resetting counter 37. During the next two cycles of CLK, latch 33 goes high, resetting counter 36, and allowing counter 37 to counter to 2. Latch 33 then goes low again, resetting counter 37 and allowing counter 36 to count to 2. Latch 33 again goes high resetting counter 36 and allowing counter 37 to reset to 2. However, because CLK is three times faster than REFCLK, the next time latch 33 goes low, counter 36 counts to 4 and counter output from counter 36 goes high, asserting CTO. When CTO is asserted, the enable (EN) bit of control register 32 (FIG. 2) is reset.

Figure 21:
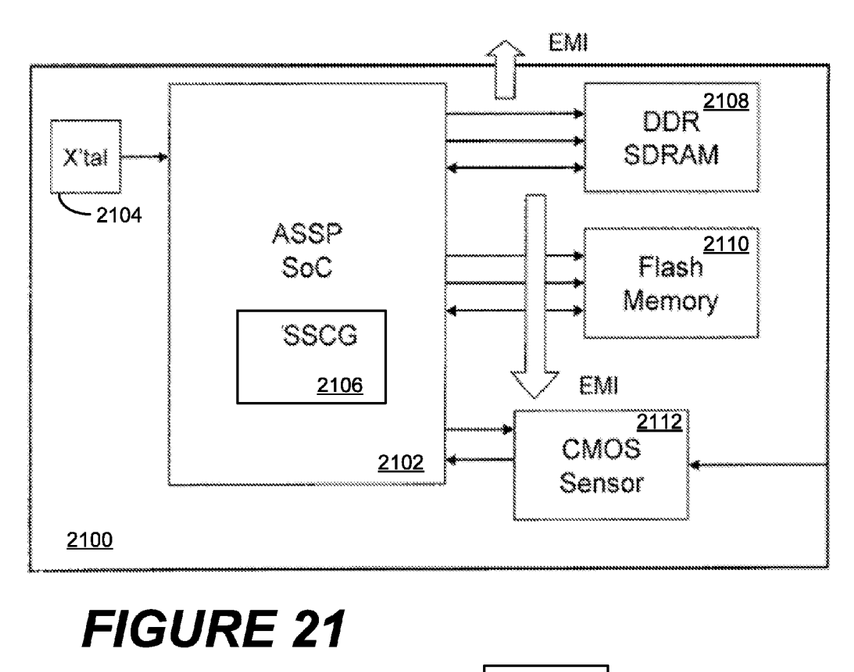
FIG. 21 illustrates an example system employing a spread spectrum clock generator.

FIG. 21 illustrates an example system 2100 employing a spread spectrum clock generator 2106. SSCG is used in such a system to generate as little Electromagnetic Interference (EMI) as possible. In one example embodiment, system 2100 is suitably adapted for a digital still camera which receives image data from CMOS sensor 2112. An Application Specific Standard Product (ASSP), System on Chip (SoC) 2102 comprises at least one central processing unit (CPU) and logic for performing the desired functionality. "Logic", as used herein, includes but is not limited to hardware, firmware, software and/or combinations of each to perform a function(s) or an action(s), and/or to cause a function or action from another component. For example, based on a desired application or need, logic may include a software controlled microprocessor, discrete logic such as an application specific integrated circuit (ASIC), a programmable/programmed logic device, memory device containing instructions, or the like, or combinational logic embodied in hardware. Logic may also be fully embodied as software. SSCG 2106 generates clocking signals for exchanging signals with DDR SDRAM (Double Data Rate Synchronous Dynamic Random Access Memory) 2108 and Flash Memory 2110. Without SSCG 2106, all of the clocks have a sharp frequency spectrum, which can generate serious EMI. The EMI may decrease the quality of the product and also can de3crease the circuit stability of system 2100. For example, CMOS sensor 2112 might generate erroneous data because of EMI from SoC 2102, DDR SDRAM 2108 and/or Flash Memory 2110. SSCG 2106 can be configured as described herein in FIGS. 1-20.

Figure 22:
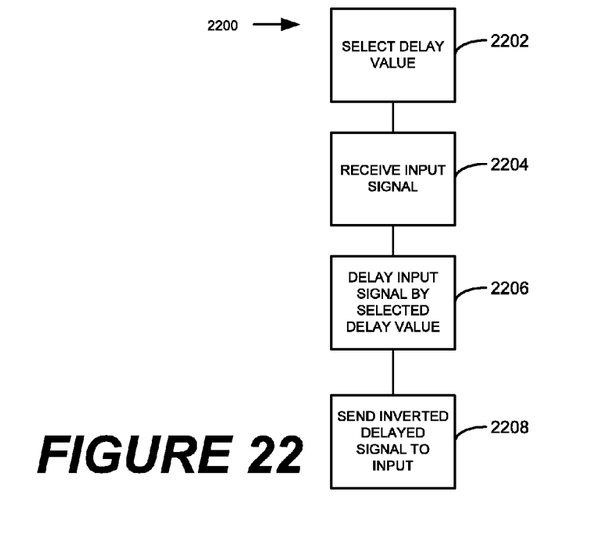
FIG. 22 illustrates an example methodology.

In view of the foregoing structural and functional features described above, a methodology in accordance with various aspects of the present invention will be better appreciated with reference to FIG. 22. While, for purposes of simplicity of explanation, the methodology of FIG. 22 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect the present invention. Embodiments of the present invention are suitably adapted to implement the methodology in hardware, software, or a combination thereof.

At 2202, a delay value for a signal is selected. In one embodiment, the delay value may be the same resolution as the delay circuit, e.g. a delay line or a circuit that performs a substantially equivalent function. In another embodiment, the delay circuit resolution can be selected using higher resolution than the delay circuit has by using techniques described herein, such as described in FIGS. 2-10. For example, for higher resolution, a time period can be selected and during that period a first predetermined number of clock pulses with a first pulse width are generated and a second predetermined number of clock pulses with a second pulse width are generated. For example, if the resolution is 2 ps and it is desired to generate a 3 ps clock over 8 cycles (3 additional bits of resolution), then 4 clock pulses are generated with a 2 ps width and 4 clock pulses are generated 4 ps pulse width, therefore the average width for the period is [4×2 ps+4×4 ps]/8=3 ps.

At 2204, a signal is received at an input of a delaying circuit. The signal received at 2204 is delayed at 2206 by a predetermined amount of time based on the delay value selected at 2202. After the delay, the signal is output. As illustrated at 2208, the output signal from the delaying circuit is inverted and then fed back to the input of the delaying circuit.

What has been described above includes exemplary implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims interpreted in accordance with the breadth to which they are fairly, legally and equitably entitled.

The invention claimed is:

1. An apparatus, comprising:
    a programmable delay line, the programmable delay line comprising a signal input, a signal output and a delay value input;
    an inverter coupled between the signal input and the signal output; and
    a delay select circuit, the delay select circuit comprises a first input having a first input data length, a second input having a second input data length and an output having a data length less than the combined data length of the first input and the second input;
    wherein a signal received at the signal input is delayed by a time period based on a value received at the delay value input before appearing at the signal output
    wherein the output of the delay select circuit is coupled to the delay value input of the programmable delay line; and
    wherein the programmable delay line is responsive to delay the signal received at the signal input by an amount of time specified by the delay select circuit.

2. An apparatus according to claim 1, the delay circuit comprising:
    a summing circuit, the summing circuit having an output coupled to the delay value input of the programmable delay line, a first input for receiving a delay mantissa value and a second input;
    a decoder having an output coupled to the second input of the summing circuit, a first input for receiving a delay fractional value and a second input;
    a counter having an output coupled to the second input of the decoder;
    wherein the decoder is responsive to the counter and the delay fractional value to output a logical one signal to the summing circuit based on predetermined combinations of counter values and delay fractional values.

3. An apparatus according to claim 2, further comprising an AND gate coupled between the inverter and the signal input, the AND gate having a first input coupled to the inverter, a second input for receiving an enable signal and an output coupled to the signal input.

4. An apparatus according to claim 3, further comprising a second inverter having an input coupled to the output of the AND gate and an output, wherein a clock signal is obtained from the output of the second inverter.

5. An apparatus according to claim 2, further comprising a pattern generator circuit, the pattern generator circuit configured to generate a predetermined spread spectrum clock generation pattern and to provide the delay mantissa value to the summing circuit and the delay fraction value to the decoder.

6. An apparatus according to claim 5, wherein the pattern generator circuit is configured to modulate a frequency of a clock signal generated by the programmable delay line by increasing the time period the signal input is delayed during a first half of a base period and decreasing the time period the signal input is delayed during a second half of the base period.

7. An apparatus according to claim 6, wherein the pattern generator is configured to increase the time period the input signal is delayed linearly during the first half of the base period and wherein the slope during a first portion of the first half of the base period is greater than the slope during a second portion of the first half of the base period.

8. An apparatus according to claim 7, wherein the pattern generator is configured to decrease the time period the input signal is delayed linearly during the second half of the base period and wherein the slope during a first portion of the second half of the base period is greater than the slope during a second portion of the second half of the base period.

9. An apparatus, comprising:
    application specific logic, the application specific logic comprises a programmable delay line, the programmable delay line comprising a signal input, a signal output and a delay value input, and an inverter coupled between the signal input and the signal output, wherein a signal received at the signal input is delayed by a time period based on a value received at the delay value input before appearing at the signal output;
    a reference clock signal coupled to the application specific logic;
    a double data rate synchronous dynamic random access memory coupled to the application specific logic;
    a flash memory coupled to the application specific logic; and
    a complementary-symmetry metal-oxide semiconductor sensor coupled to the application specific logic.

10. An apparatus according to claim 9, wherein the signal output of the programmable delay line is employed to generate a clocking signal for at least a portion of the application specific logic.

11. An apparatus according to claim 10, wherein the signal output of the programmable delay line is employed to generate a clocking signal for the double data rate synchronous dynamic random access memory coupled to the application specific logic and the flash memory coupled to the application specific logic.

12. An apparatus comprising:
    programmable delay means, the programmable delay means comprising an input means and an output means and is responsive to receiving a signal at the input means to delay the signal a predetermined amount of time before outputting the signal at the output means;
    inverting means coupled between the input means and the output means; and
    delay select means, the delay select means comprises a first input having a first input data length, a second input having a second input data length and an output having a data length less than the combined data length of the first input and the second input;
    wherein the output of the delay select means is coupled to a delay value input of the programmable delay means; and
    wherein the programmable delay means is responsive to delay the signal received at the input means by an amount of time specified by the delay select means.

13. An apparatus according to claim 12, further comprising pattern generating means, the pattern generator means configured to generate a predetermined spread spectrum clock generation pattern and to provide delay values to the delay select means.

14. An apparatus according to claim 13, wherein the pattern generating means is configured to modulate a frequency of a clock signal generated by the programmable delay line by increasing the time period the signal input is delayed during a first half of a base period and decreasing the time period the signal input is delayed during a second half of the base period.

15. An apparatus according to claim 14, wherein the pattern generating means is configured to increase the time period the input signal is delayed linearly during the first half of the base period and wherein the slope during a first portion of the first half of the base period is greater than the slope during a second portion of the first half of the base period.

16. A method, comprising selecting a delay value;

receiving a signal at an input of a delay circuit;

outputting the signal to an output of the delay circuit after a time period corresponding to the delay value has elapsed; and inverting the signal from the output of the delay circuit and sending the inverted signal to the input of the delay circuit; and adjusting the delay value wherein during a predefined period a first predetermined number of clock signals having a first period are generated and a second predetermined number of clock signals having a second period are generated.

17. A method, comprising selecting a delay value;

receiving a signal at an input of a delay circuit;

outputting the signal to an output of the delay circuit after a time period corresponding to the delay value has elapsed; and inverting the signal from the output of the delay circuit and sending the inverted signal to the input of the delay circuit; and adjusting the delay value for generating a clock pattern such that a spread spectrum clock is generated.

* * * * *